United States Patent
Seok

(10) Patent No.: US 9,843,558 B2
(45) Date of Patent: Dec. 12, 2017

(54) METHOD AND APPARATUS FOR TRANSMITTING AND RECEIVING A FRAME SUPPORTING A SHORT MAC HEADER IN WIRELESS LAN SYSTEM

(71) Applicant: LG ELECTRONICS INC., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/435,068

(22) PCT Filed: Oct. 7, 2013

(86) PCT No.: PCT/KR2013/008938
§ 371 (c)(1),
(2) Date: Apr. 10, 2015

(87) PCT Pub. No.: WO2014/058193
PCT Pub. Date: Apr. 17, 2014

(65) Prior Publication Data
US 2015/0271137 A1    Sep. 24, 2015

Related U.S. Application Data

(60) Provisional application No. 61/712,813, filed on Oct. 12, 2012, provisional application No. 61/749,393, filed on Jan. 7, 2013.

(51) Int. Cl.
*H04W 4/00* (2009.01)
*H04L 29/12* (2006.01)
(Continued)

(52) U.S. Cl.
CPC ...... *H04L 61/6022* (2013.01); *H04L 63/0876* (2013.01); *H04L 67/2842* (2013.01);
(Continued)

(58) Field of Classification Search
USPC ........................................ 370/230, 328, 338
See application file for complete search history.

(56) References Cited

U.S. PATENT DOCUMENTS 8,934,407 B2    1/2015  Chion et al.
9,137,823 B1    9/2015  Liu et al.
(Continued)

FOREIGN PATENT DOCUMENTS

CN    102365884 A    2/2012
JP    2010-200333 A    9/2010
(Continued)

OTHER PUBLICATIONS

M. Park, Intel: "Proposed Specification Framework for TGah", IEEE P802.11 Wireless LANs, IEEE 802.11-11/1137r10, Jul. 18, 2012, XP068037175.
(Continued)

*Primary Examiner* — Phuongchau Ba Nguyen
(74) *Attorney, Agent, or Firm* — Dentons US LLP

(57) ABSTRACT

A method and apparatus for transmitting and receiving a frame supporting a short MAC header in a wireless LAN (WLAN) system are disclosed. A method for managing a sequence number in a wireless LAN (WLAN) system includes: transmitting, by a first station (STA), a frame including a short MAC header to a second STA. One of a receiver address (RA) field and a transmitter address (TA) field contained in the short MAC header includes an associated identifier (AID) value according to whether a transmission direction of the frame is an uplink (UL) or downlink (DL) direction, and if the RA field includes the AID value, the sequence number for the frame is assigned based on a station (STA) MAC address identified by the AID value.

5 Claims, 13 Drawing Sheets

(51) Int. Cl.

| | | |
|---|---|---|
| *H04W 12/06* | (2009.01) | |
| *H04W 52/02* | (2009.01) | |
| *H04L 29/06* | (2006.01) | |
| *H04W 28/06* | (2009.01) | |
| *H04L 29/08* | (2006.01) | |
| *H04W 84/12* | (2009.01) | |

(52) U.S. Cl.
CPC .............. *H04L 69/04* (2013.01); *H04L 69/22* (2013.01); *H04W 4/005* (2013.01); *H04W 12/06* (2013.01); *H04W 28/06* (2013.01); *H04W 52/0209* (2013.01); *H04W 84/12* (2013.01); *Y02B 60/50* (2013.01)

(56) References Cited

U.S. PATENT DOCUMENTS

| | | |
|---|---|---|
| 2004/0013105 A1 | 1/2004 | Ahmavaara et al. |
| 2007/0147284 A1 | 6/2007 | Sammour et al. |
| 2008/0259853 A1 | 10/2008 | Ito |
| 2008/0273700 A1 | 11/2008 | Wentink |
| 2009/0010194 A1 | 1/2009 | Seok et al. |
| 2009/0022132 A1 | 1/2009 | Adachi et al. |
| 2009/0276677 A1 | 11/2009 | Saito et al. |
| 2010/0135495 A1 | 6/2010 | Chion et al. |
| 2010/0246502 A1 | 9/2010 | Gong et al. |
| 2010/0246600 A1 | 9/2010 | Das et al. |
| 2011/0026505 A1 | 2/2011 | Trainin |
| 2011/0055558 A1 | 3/2011 | Liu et al. |
| 2011/0128929 A1 | 6/2011 | Liu et al. |
| 2012/0044925 A1 | 2/2012 | Lee et al. |
| 2012/0163378 A1 | 6/2012 | Kim et al. |
| 2012/0263091 A1* | 10/2012 | Kim ............... H04B 7/0452 370/312 |
| 2013/0022032 A1 | 1/2013 | Taghavi Nasrabadi et al. |
| 2013/0107895 A1 | 5/2013 | Wentink |
| 2013/0128809 A1* | 5/2013 | Wentink ........... H04L 29/0604 370/328 |
| 2013/0155952 A1 | 6/2013 | Chu et al. |
| 2013/0195001 A1 | 8/2013 | Liu |
| 2013/0223210 A1* | 8/2013 | Asterjadhi .......... H04L 1/0025 370/230 |
| 2013/0272137 A1 | 10/2013 | Kwon et al. |
| 2014/0034775 A1 | 2/2014 | Hutson |
| 2014/0036772 A1 | 2/2014 | Asterjadhi et al. |
| 2014/0036775 A1* | 2/2014 | Asterjadhi ......... H04W 28/065 370/328 |
| 2014/0036807 A1 | 2/2014 | Huang et al. |
| 2014/0064261 A1 | 3/2014 | Wang et al. |
| 2014/0307747 A1 | 10/2014 | Yang et al. |
| 2014/0334287 A1 | 11/2014 | Chen et al. |
| 2015/0289164 A1* | 10/2015 | Seok ................ H04W 84/12 370/311 |

FOREIGN PATENT DOCUMENTS

| | | |
|---|---|---|
| KR | 100930136 B1 | 12/2009 |
| WO | 2009/004631 A1 | 1/2009 |
| WO | 2011/028565 A1 | 3/2011 |
| WO | 2012/033379 A2 | 3/2012 |
| WO | 2012/059182 A1 | 5/2012 |
| WO | 2012/103381 A1 | 8/2012 |
| WO | 2012/159094 A2 | 11/2012 |

OTHER PUBLICATIONS

IEEE 802 11 Working Group: "802.11i Part 11: Wireless LAN Medium Access Control (MAC) and Physical Layer (PHY) specifications, Amendment 6: Medium Access Control (MAC) Security Enhancements", IEEE Std. 802.11I-2004, Jul. 23, 2004, XP002368930.
D. Ross: "Securing IEEE 802.11 Wireless LANs", Information Security Institute, Faculty of Science and Technology, Queensland University of Technology, Jun. 7, 2010, See abstract.
Huawei Technologies Co., Ltd.: "WLAN Access Security Technical White Paper", Sep. 24, 2012, See pp. 25-26.
Ruoying Gong: "Wireless LAN and Security", Mar. 9, 2012, See pp. 28-29.
ADI-AMD, ARM-DSP Group, LSI Logic ZSP, MIPS-TI, "Counter CBC-MAC Protocol (CCMP) Encryption Algorithm", Vocal Technologies, Ltd., software libraries, 2003.
M. Junaid et al., "Vulnerabilities of IEEE 802.11i Wireless LAN CCMP Protocol", World Academy of Science, Engineering and Technology, International Journal of Computer, Electrical, Automation, Control and Information Engineering, vol. 1, No. 11, 2007.
Dr. G. Padmavathi et al., "CCMP-AES Model with DSR routing protocol to secure Link layer and Network layer in Mobile Adhoc Networks", (IJCSE) International Journal on Computer Science and Engineering, vol. 02, No. 05, 2010, 1524-1531.
Qualcomm, MediaTek, Huawei, ZTE, LG Electronics, Intel Corp., Marvell, Broadcom, Samsung, ETRI, Nokia, MAC Header Compression, IEEE 802.11-12/0646r0, May 14, 2012.
Qualcomm, Intel Corp., Marvell, LG Electronics, Broadcom, ZTE, Samsung, ETRI, Nokia, Panasonic, Short MAC Header IEEE 802.11-12/0857r0, Jul. 15, 2012.
Abu-Surra, et al.: "PHY/MAC Complete Proposal Specification", IEEE 802.11-10/0433r2, IEEE P802.11 Wireless LANs, May 18, 2010.

* cited by examiner

FIG. 18
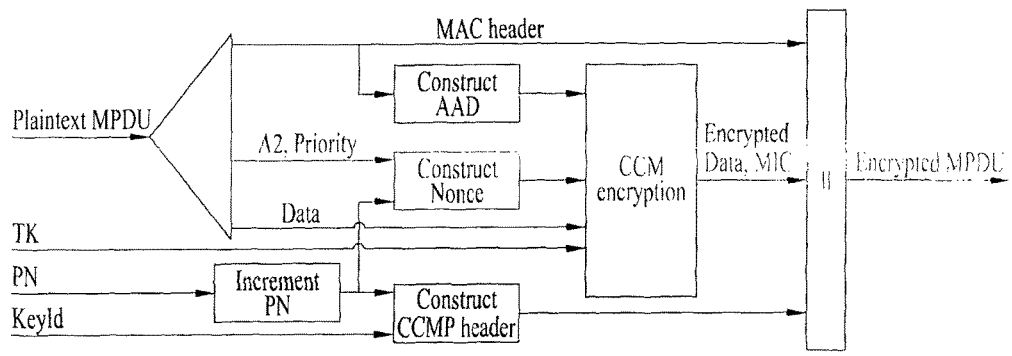
FIG. 19
| Protocol Version | Type | From DS | More Fragment | Power Management | More Data | Protected Frame | EOSP | A3 Present | Retry | Reserved |
|---|---|---|---|---|---|---|---|---|---|---|
| Bits: 2 | 4 | 1 | 1 | 1 | 1 | 1 | 1 | 1 | 1 | 1 |
FIG. 20
| | FC | A1 | A2 | A3 | SC | A4 |
|---|---|---|---|---|---|---|
| Octets: | 2 | 6 or 2 | 6 or 2 | 6 | 2 | 6 |
FIG. 21
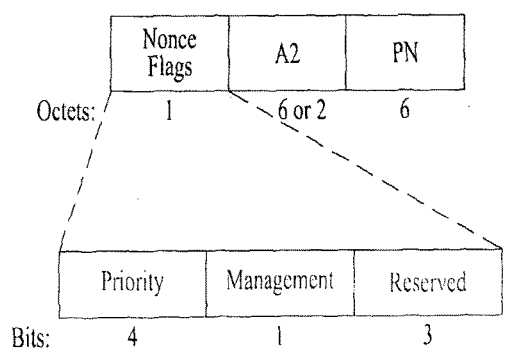

METHOD AND APPARATUS FOR TRANSMITTING AND RECEIVING A FRAME SUPPORTING A SHORT MAC HEADER IN WIRELESS LAN SYSTEM

TECHNICAL FIELD

The present invention relates to a wireless communication system, and more particularly to a method and apparatus for transmitting and receiving a frame supporting a short MAC header in a wireless LAN (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (FIT) of 540 Mbps. In addition, Multiple Input and Multiple Output (MIMO) technology has recently been applied to both a transmitter and a receiver so as to minimize transmission errors as well as to optimize a data transfer rate.

DISCLOSURE

Technical Problem

Accordingly, the present invention is directed to a method and apparatus for transmitting and receiving a frame including a partial association identifier (PAID) in a WLAN system that substantially obviate one or more problems due to limitations and disadvantages of the related art. Machine to Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

An object of the present invention is to provide a method for managing a sequence number when a short MAC header is used so as to perform STA power saving as well as to prevent the occurrence of a malfunction. Another object of the present invention is to provide a method for constructing an encrypted data unit when a short MAC header is used.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for managing a sequence number in a wireless LAN (WLAN) system including: transmitting, by a first station (STA), a frame including a short MAC header to a second STA, wherein one of a receiver address (RA) field and a transmitter address (TA) field contained in the short MAC header includes an associated identifier (AID) value according to whether a transmission direction of the frame is an uplink (UL) or downlink (DL) direction, and if the RA field includes the AID value, the sequence number for the frame is assigned based on a station (STA) MAC address identified by the AID value.

In yet another aspect of the present invention, a station (STA) for managing a sequence number in a wireless LAN (WLAN) system includes: a transceiver; and a processor, wherein the processor enables a first station (STA) to transmit a frame including a short MAC header to another STA using the transceiver, wherein one of a receiver address (RA) field and a transmitter address (TA) field contained in the short MAC header includes an associated identifier (AID) value according to whether a transmission direction of the frame is an uplink (UL) or downlink (DL) direction, and if the RA field includes the AID value, the sequence number for the frame is assigned based on a station (STA) MAC address identified by the AID value.

The following description may be commonly applied to the embodiments of the present invention.

The sequence number of the STA MAC address identified by the AID value may be cached by the first STA.

The sequence number may be sequentially increased on the basis of the STA MAC address identified by the AID value.

If the frame is transmitted in the downlink (DL) direction, the receiver address (RA) field may include an AID value of the second STA, and the transmitter address (TA) field may include a Basic Service Set Identifier (BSSID) value.

The short MAC header may include a Frame Control field, an Address 1 field, an Address 2 field, and a Sequence Control field, wherein the Address 1 field is the receiver address (RA) field, the Address 2 field is the transmitter address (TA) field, and the Sequence Control field includes the sequence number value.

In another aspect of the present invention, a method for managing a sequence number in a wireless LAN (WLAN) system includes: receiving, by a second station (STA), a frame including a short MAC header from a second STA, wherein one of a receiver address (RA) field and a transmitter address (TA) field contained in the short MAC header includes an associated identifier (AID) value according to whether a transmission direction of the frame is an uplink (UL) or downlink (DL) direction, and if the TA field includes the AID value, caching, by the second STA, an STA MAC address identified by the AID value and the sequence number value included in the MAC header.

In another aspect of the present invention, a station (STA) for managing a sequence number in a wireless LAN (WLAN) system includes: a transceiver; and a processor, wherein the processor enables a second STA to receive a frame including a short MAC header from another STA using the transceiver, wherein one of a receiver address (RA) field and a transmitter address (TA) field contained in the short MAC header includes an associated identifier (AID) value according to whether a transmission direction of the frame is an uplink (UL) or downlink (DL) direction, and if the TA field includes the AID value, caching, by the second STA an STA MAC address identified by the AID value and the sequence number value included in the MAC header.

The following description may be commonly applied to the embodiments of the present invention.

If the STA MAC address identified by the AID value of the frame and the sequence number value contained in the MAC header are respectively identical to an STA MAC address identified by the AID value and the sequence number which are previously cached, the frame is determined to be a duplicated frame.

A retry bit of the frame may be set to 1.

If the frame is transmitted in UL direction, the receiver address (RA) field may include a Basic Service Set Identifier (BSSID), and the transmitter address (TA) field may include an AID value of the first STA.

The short MAC header may include a Frame Control field, an Address 1 field, an Address 2 field, and a Sequence Control field, wherein the Address 1 field is the receiver address (RA) field, the Address 2 field is the transmitter address (TA) field, and the Sequence Control field includes the sequence number value.

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention can provide a method and apparatus for managing a sequence number when a short MAC header is used. In addition, the embodiments of the present invention can provide a method and apparatus for constructing an encrypted data unit when a short MAC header is used.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 18 is a block diagram illustrating CCMP (Counter mode with Cipher-block chaining Message authentication code Protocol) encapsulation.

FIG. 19 is a conceptual diagram illustrating a frame control field of a short MAC header according to an embodiment.

FIG. 20 is a conceptual diagram illustrating an example of Additional Authentication Data (AAD) according to an embodiment.

FIG. 21 is a conceptual diagram illustrating a Nonce according to an embodiment.

BEST MODE

Figure 1:
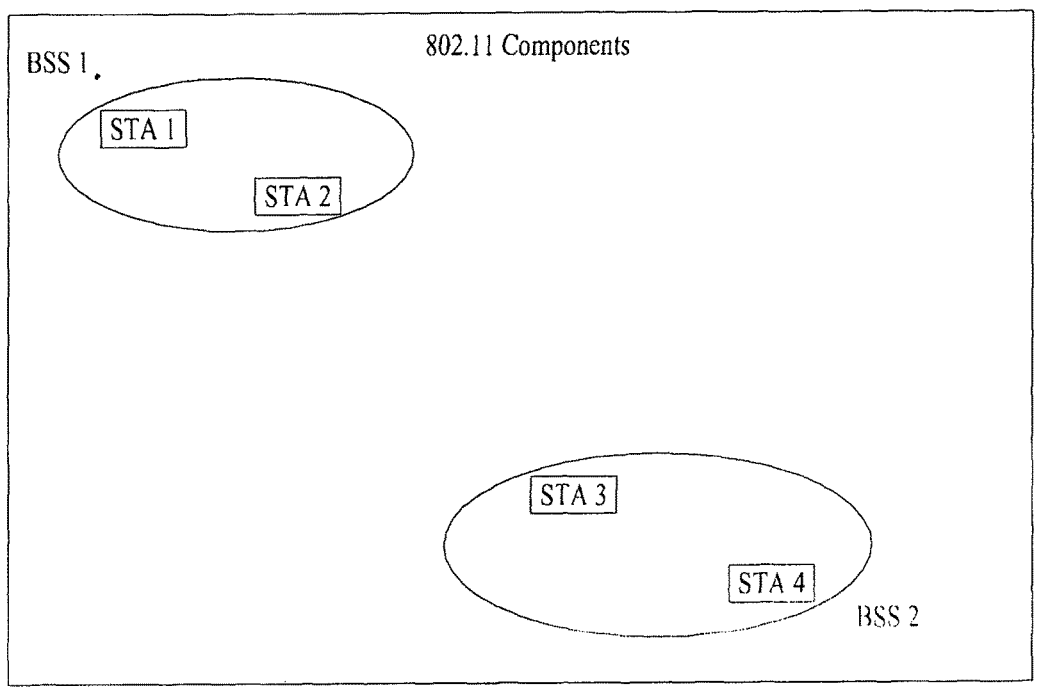
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
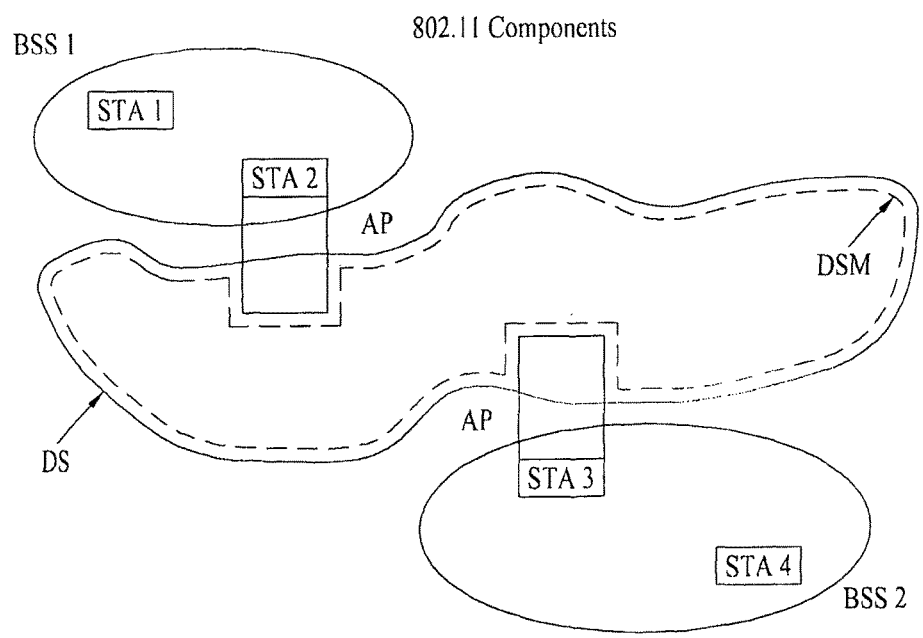
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by Physical layer (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
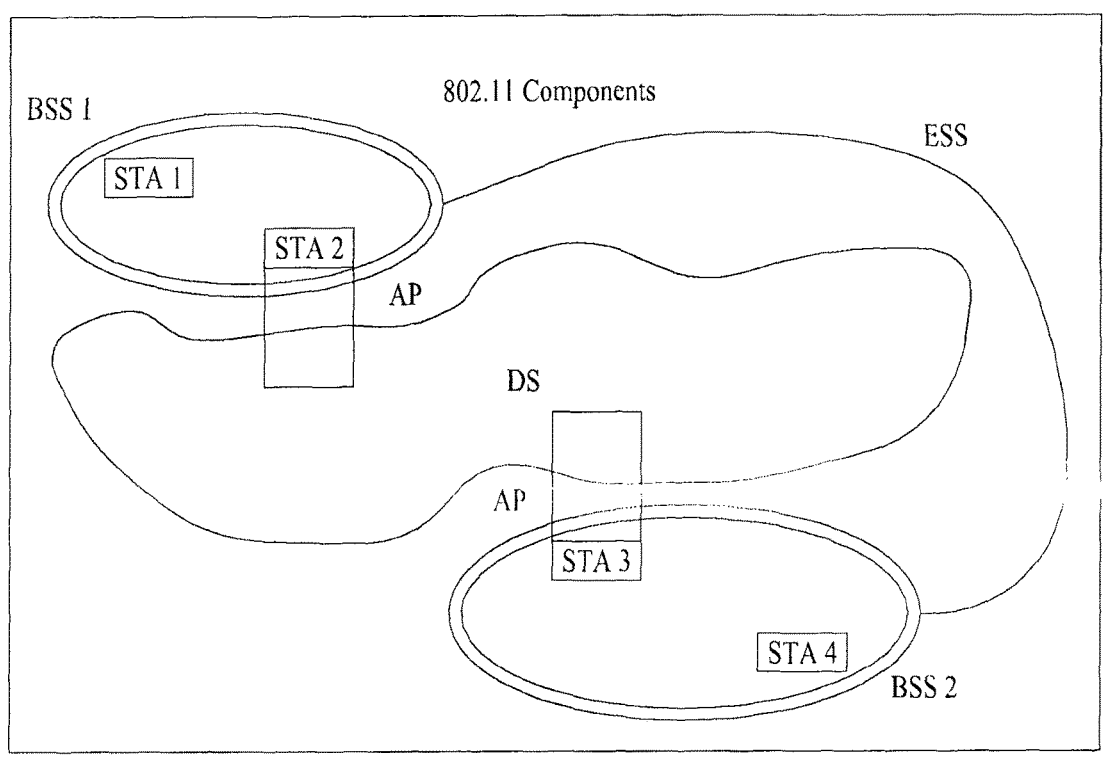
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
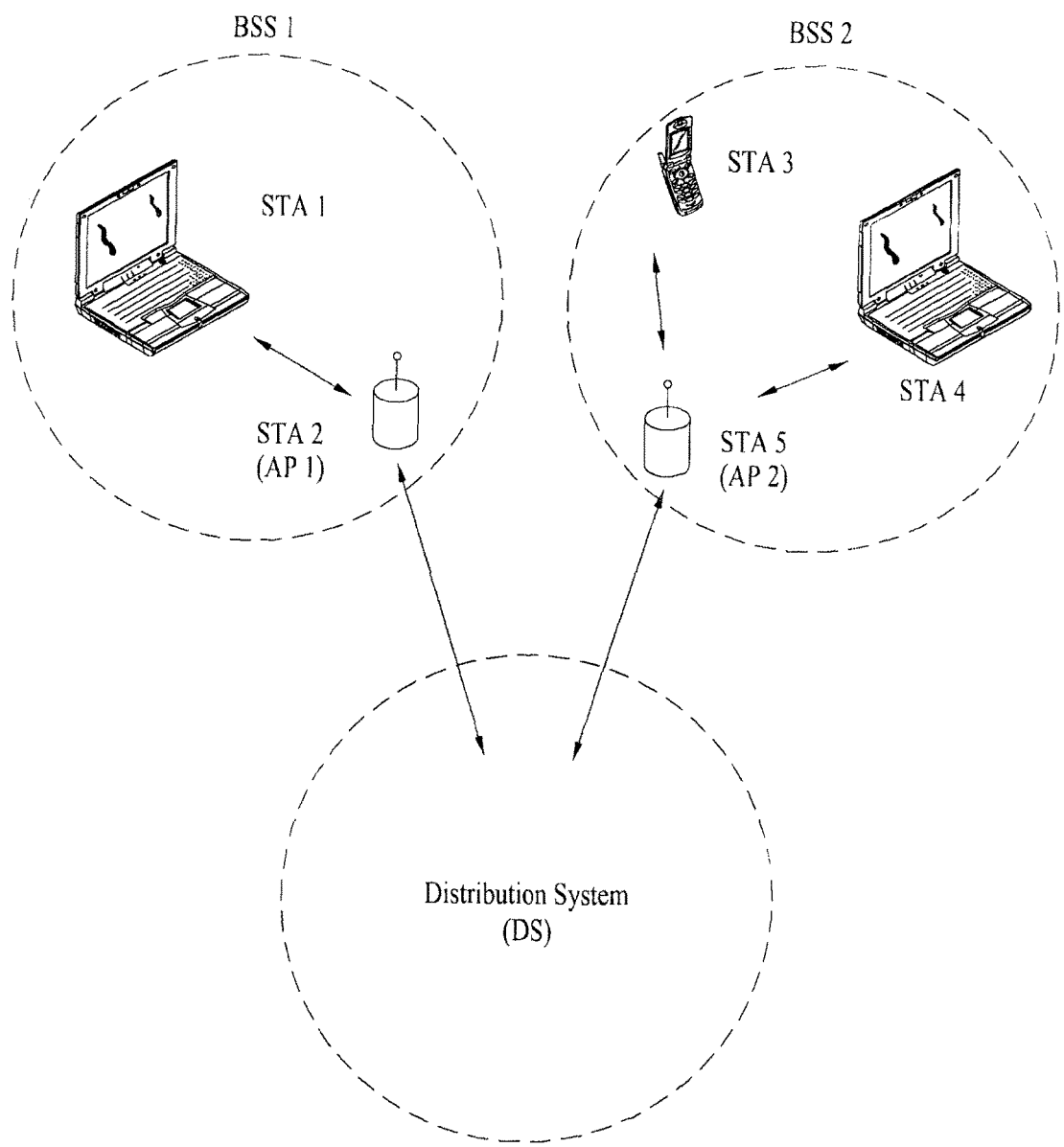
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
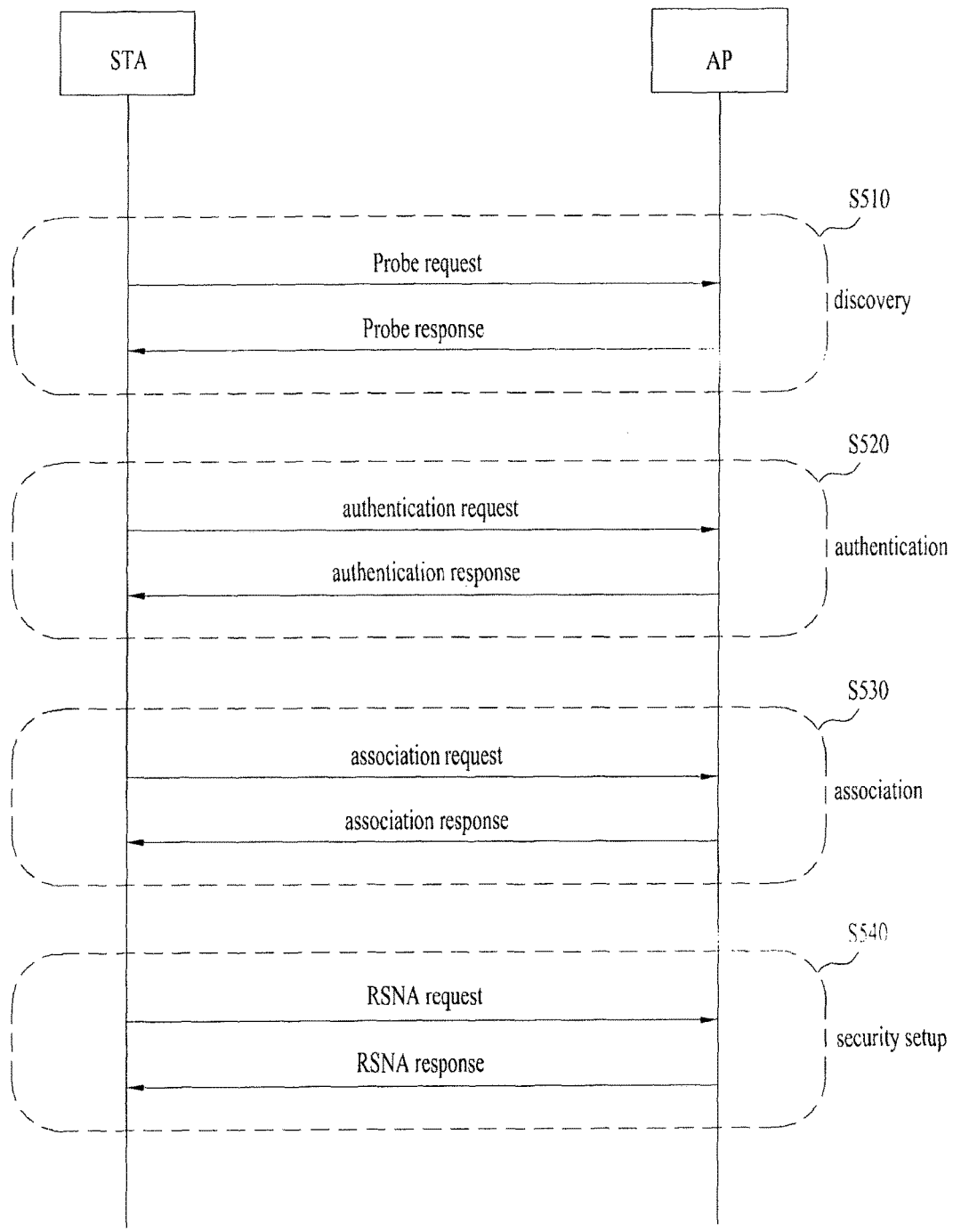
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a FIT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, a DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
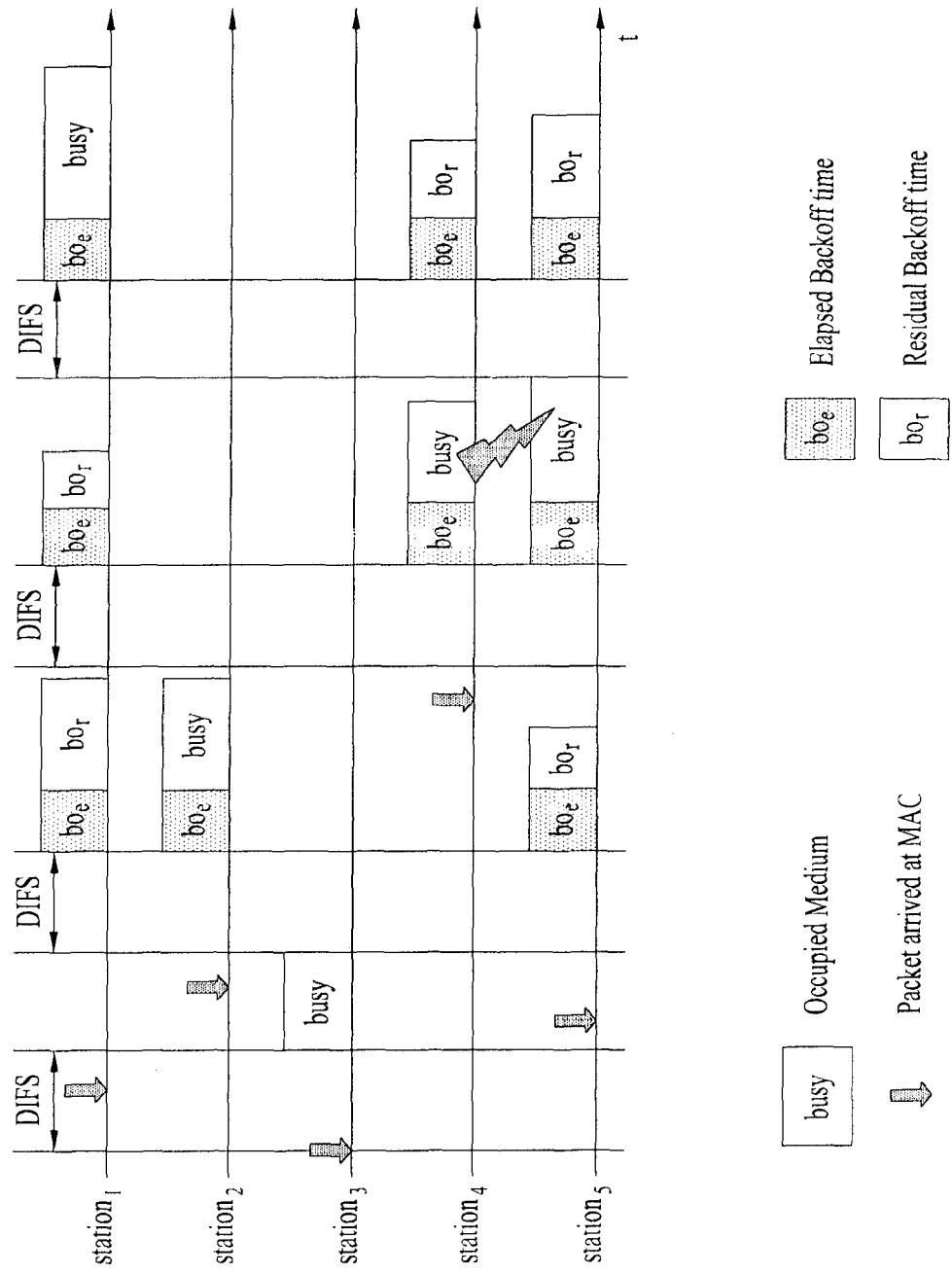
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n= 0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
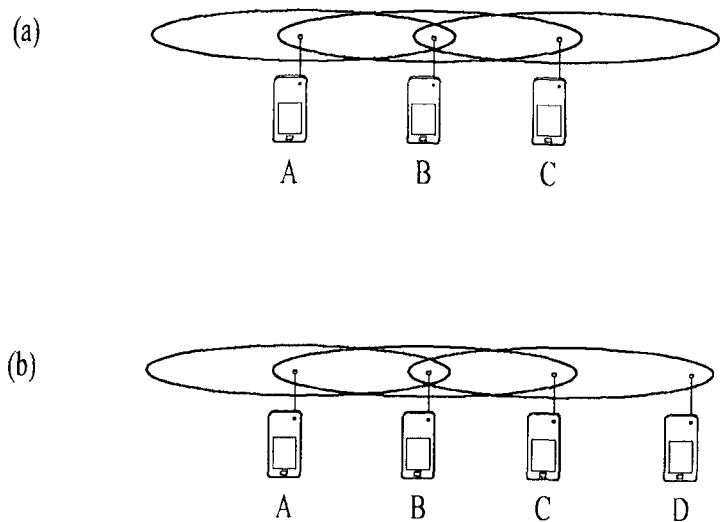
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
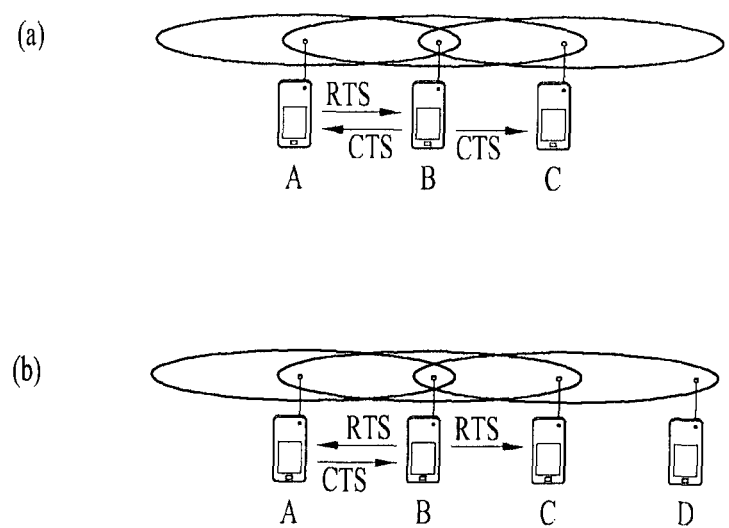
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
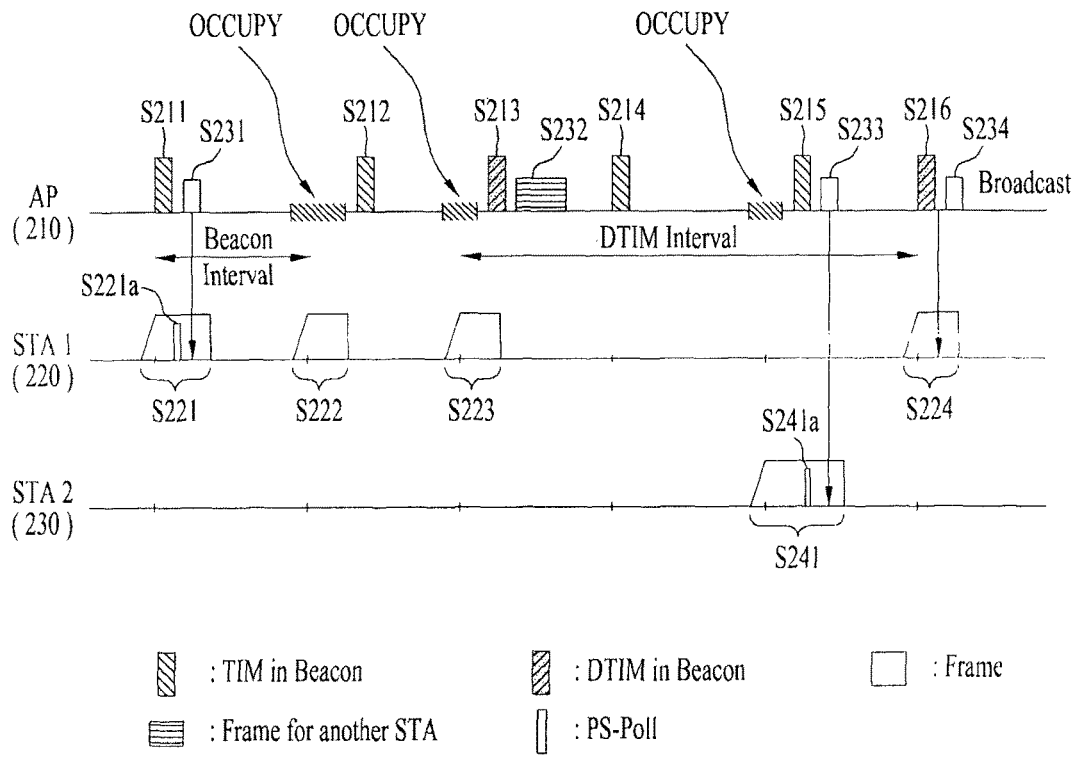
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
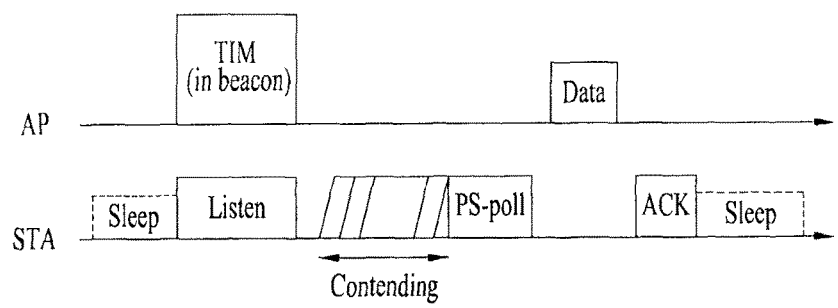
FIGS. 10 to 12 are conceptual diagrams illustrating detailed operations of a station (STA) having received a Traffic Indication Map (TIM).
Figure 11:
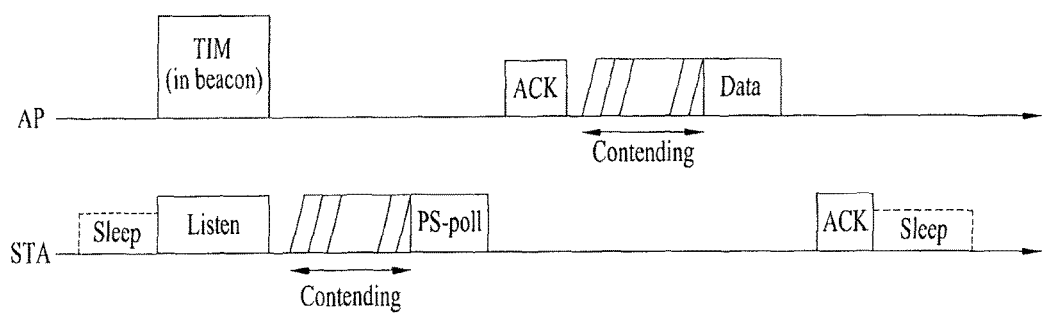
Figure 12:
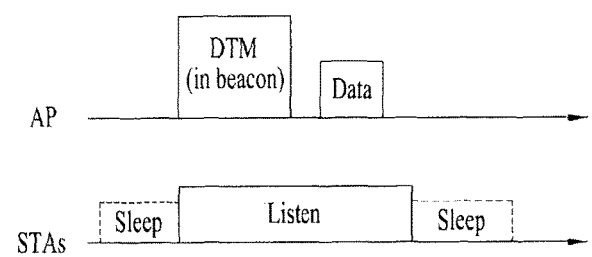

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

Figure 13:
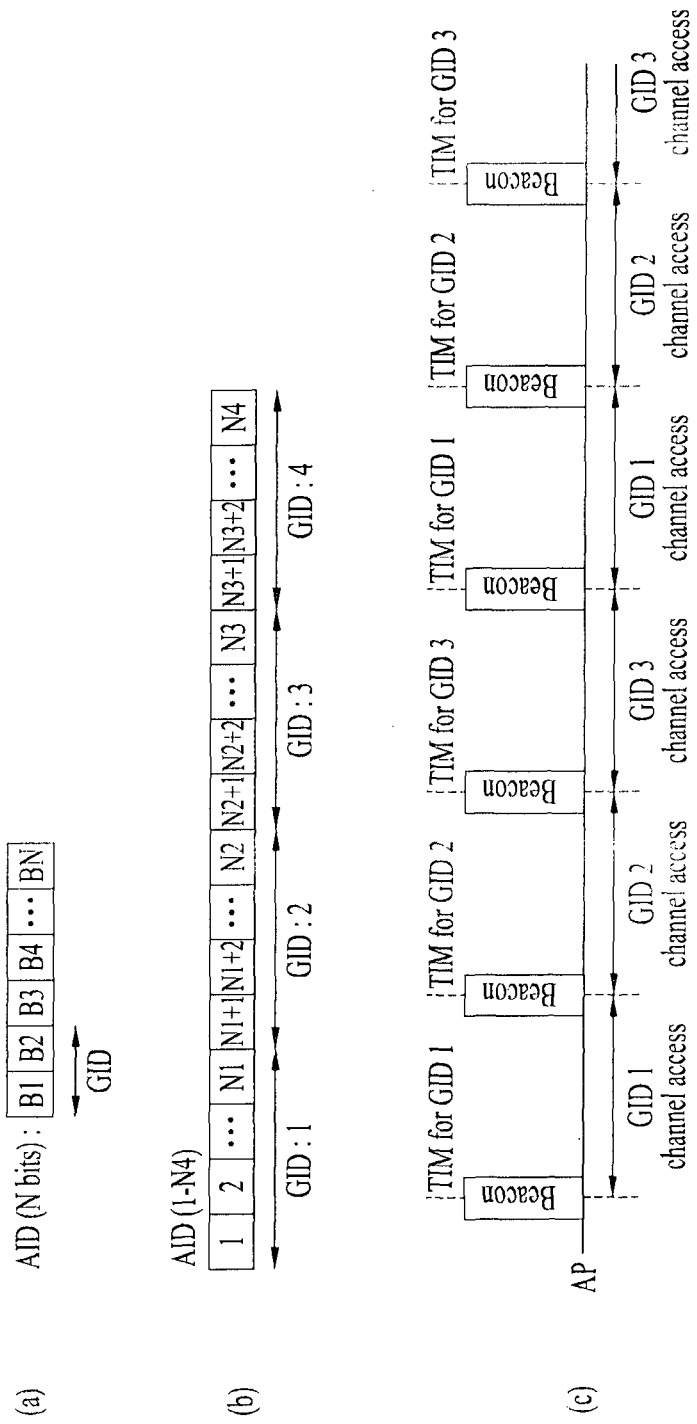
FIG. 13 is a conceptual diagram illustrating a group-based AID.

FIG. 13($a$) is a conceptual diagram illustrating a group-based AID. In FIG. 13($a$), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13($b$) is a conceptual diagram illustrating a group-based AID. In FIG. 13($b$), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13($b$) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel access is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13($c$). If AIDs are divided into three groups, the channel access mechanism according to the beacon interval is exemplarily shown in FIG. 13($c$). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present invention is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present invention, various schemes for dividing STAs (or AIDs allocated to respective STAs) into predetermined hierarchical group units, and managing the divided result may be applied to the embodiments, however, the group-based AID allocation scheme is not limited to the above examples.

Frame Structure

Figure 14:
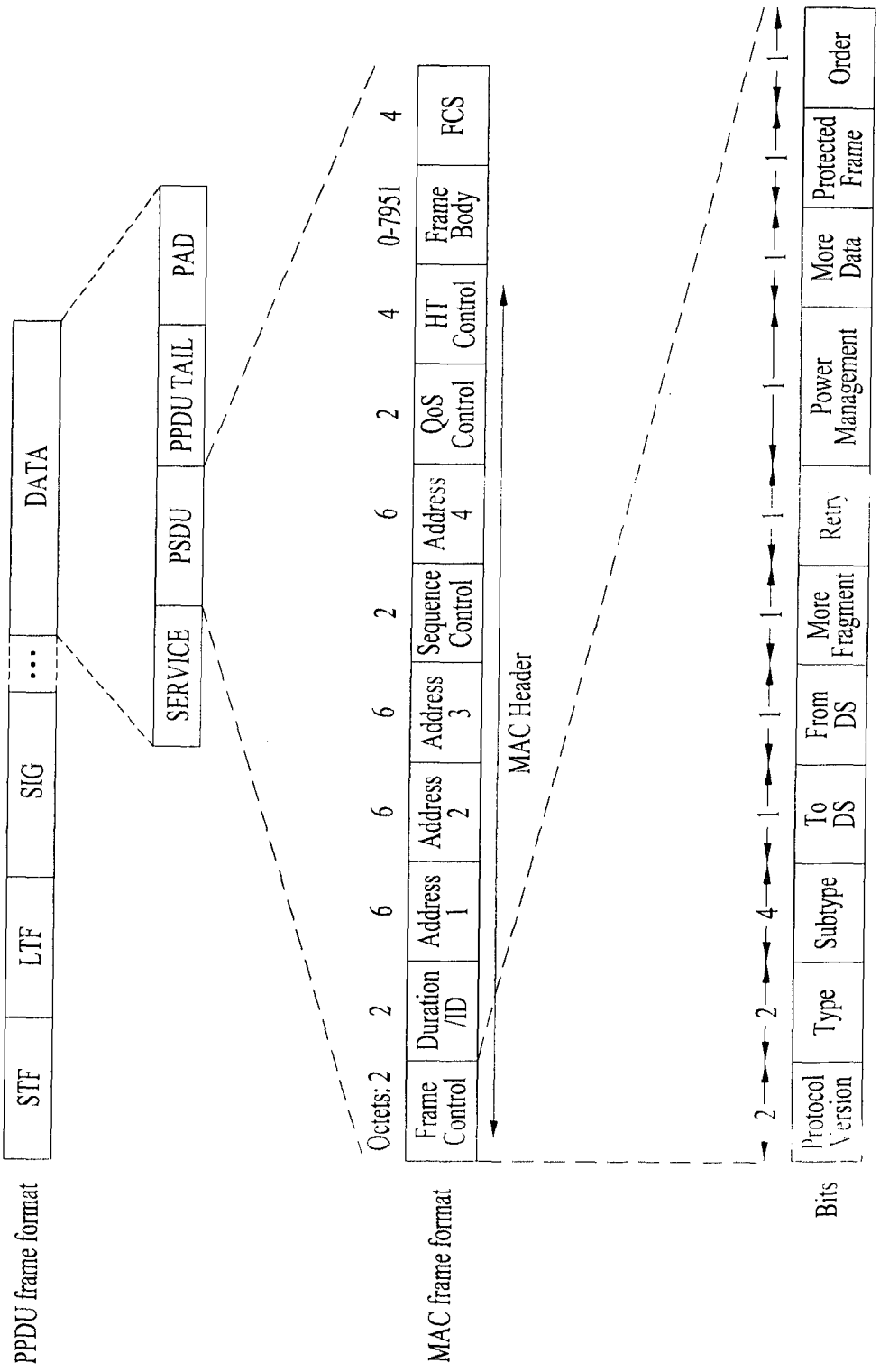
FIG. 14 is a conceptual diagram illustrating a frame structure for use in IEEE 802.11.

FIG. 14 is a diagram for explaining an exemplary frame format used in 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-FIT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

A MAC header may include a frame control field, a Duration/ID field, an address field, etc. The frame control field may include control information requisite for frame transmission/reception. The Duration/ID field may be established as a specific time for transmitting the corresponding frame or the like. For a detailed description of Sequence Control, QoS Control, and HT Control sub-fields of the MAC header reference may be made to the IEEE 802.11-2012 standard documentation.

The frame control field of the MAC header may include Protocol Version, Type, Subtype, To DS, From DS, More Fragment, Retry, Power Management, More Data, Protected Frame, and Order sub-fields. A detailed description of individual sub-fields of the frame control field may refer to IEEE 802.11-2012 standard documents.

The following table 1 shows a 'To DS' subfield and a 'From DS' subfield contained in the frame control field defined in the legacy IEEE 11ac standard.

TABLE 1

| To DS and From DS values | Meaning |
| --- | --- |
| To DS = 0, From DS = 0 | A data frame directs from one STA to another STA within the same IBSS, a data frame directs from one non-AP STA to another non-AP STA within the same BSS, or a data frame escapes from the context of a BSS, as well as all management and control frames. |
| To DS = 1, From DS = 0 | A data frame destined for the DS or being sent by a STA associated with an AP to the Port Access Entity in that AP. |
| To DS = 0, From DS = 1 | A data frame exiting the DS or being sent by the Port Access Entity in an AP. |
| To DS = 1, From DS = 1 | A data frame using the four-address format. This standard does not define procedures for using this combination of field values.) |

Four address fields (Address 1, Address 2, Address 3, Address 4) of the MAC header may be used to indicate a Basic Service Set Identifier (BSSID), a Source Address (SA), a Destination Address (DA), a Transmitter Address (TA), a Receiver Address (RA), etc. Only some parts from among four address fields may be included according to frame type. The use of the address fields may be specified by relative positions of the address fields (Address 1-Address 4) of the MAC header, irrespective of address types of the corresponding field. For example, the receiver address (RA) may always be confirmed on the basis of contents of the Address 1 field of the received frame. The receiver address (RA) of the CTS frame may always be obtained from the Address 2 field of the corresponding RTS frame. The receiver address (RA) of the ACK frame may always be obtained from the Address 2 field of an objective frame indicating an ACK target. The following table 2 shows contents of the address fields (Address 1~Address 4) of the MAC header according to values of 'To DS subfield' and 'From DS subfield' contained in the frame control field of the MAC header.

TABLE 2

| To DS | From DS | Address 1 | Address 2 | MSDU case | A-MSDU case | Address 3 MSDU case | Address 4 A-MSDU case |
|---|---|---|---|---|---|---|---|
| 0 | 0 | RA = DA | TA = SA | BSSID | BSSID | N/A | N/A |
| 0 | 1 | RA = DA | TA = BSSID | SA | BSSID | N/A | N/A |
| 1 | 0 | RA = BSSID | TA = SA | DA | BSSID | N/A | N/A |
| 1 | 1 | RA | TA | DA | BSSID | SA | BSSID |

In Table 2, RA is a receiver address, TA is a transmitter address, DA is a destination address, and SA is a source address. In addition, MSDU is a MAC Service Data Unit (SDU) serving as an information unit communicated between MAC Service Access Points (SAPs). A-MSDU (Aggregate-MSDU) is a format of a frame configured to transmit a plurality of MAC SDUs through one MAC PDU. The value of each address field (Address 1, Address 2, Address 3, or Address 4) may be set to an Ethernet MAC address composed of 48 bits.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

Duplicate Detection

MAC level acknowledgment (ACK) and retransmission is defined, such that it may be possible to receive one frame one or more times. In this case, the duplicated frame should be filtered out. In order to filter out the duplicate frame, a sequence control field of the MAC header may be used. The Sequence Control field for use in the data frame and the management frame is comprised of a Sequence Number and a Fragment Number. MPDUs corresponding to the same MSDU parts have the same sequence numbers, and different MSDUs have different sequence numbers.

STA may allocate a sequence number of a frame according to a counter (for example, modulo-4096 counter starting from zero) increasing one by one per new MSDU. The STA for frame transmission is configured to store (or cache) the last sequence number for each receiver address (RA).

The STA for frame reception may cache the set of a transmitter address (TA), a sequence number, and a fragment number of the latest reception frame. TA may be decided on the basis of the Address 2 field of the received frame. If the Retry field of the frame control field is set to 1 and a frame having the same sequence number (or having the same fragment number) is received from the same TA, the reception STA determines a duplicated frame, and rejects the duplicated frame.

MAC Header Compression Method

The embodiment of the present invention proposes a compression method of the MAC header for low-power communication. For example, the MAC header compression method proposed by the embodiment may use 1 MHz/2 MHz/4 MHz/8 MHz/16 MHz channel bandwidths, and may be applied to a WLAN system operating in a frequency band of Sub 1 GHz (S1G).

Referring to FIG. 14, the MAC header may be necessarily included in a frame for data transmission. If the MAC header is reduced in size (i.e., if overhead of the MAC header is reduced), generation, transmission, reception, etc. of the MAC frame of the STA may be more simplified, resulting in reduction of power consumption of the STA.

In addition, the WLAN system (for example, IEEE 802.11ah system) operating in Sub 1 GHz (S1G) is characterized in that it operates in a low frequency band and a coverage at which a frame arrives extends to 1 km under an outdoor environment. The WLAN system is configured to mainly define a sensor- or meter-type STA having a low transfer rate and low power.

In addition, the power saving mechanism is of importance to the sensor-type STAs. For power saving, it is necessary for the sensor-type STAs to minimize the number of unnecessary awake situations, and the sensor-type STAs need to efficiently transmit transmission/reception data during an awake duration.

Accordingly, for the WLAN system operating in the S1G band, there is a need to construct a frame for supporting long-range transmission and low power consumption. In order to implement a frame supporting long-range transmission, fields of the frame may be repeated at least twice on a time axis or a frequency axis at least twice. However, the size of the MAC header is increased in response to field repetition coding, such that power saving for frame processing of the STA may unavoidably increase.

In order to solve the above problem, the present invention provides a MAC header compression method. For this purpose, a method for constructing a frame in a WLAN system operating in the S1G band will hereinafter be described in detail.

Communication for use in the S1G band has a larger coverage than the legacy indoor WLAN system in terms of propagation characteristics, PHY defined in the legacy IEEE 802.11ac system may be down-clocked to $\frac{1}{10}$. In this case, each of 20/40/80/160/80+80 MHz channel bandwidths supported by 802.11ac system is down-clocked to $\frac{1}{10}$, such that 2/4/8/16/8+8 MHz channel bandwidths may be provided to the S1G band. Accordingly, a guard interval (GI) may be increased from 0.8 μs to 8 μs in the 802.11ac system.

The legacy device is not present in the S1G band, such that a PHY preamble optimum should be efficiently designed for the S1G band without considering backward compatibility. In accordance with the most simple method for solving the above requirement, the legacy HT-GreenField PLCP frame format (defined in IEEE 802.11n) is down-clocked to $\frac{1}{10}$ so as to define the S1G PHY preamble, and the above-mentioned structure may exemplarily be applied to a bandwidth of 2 MHz or higher.

In order to support long-range communication, STF/LTF/SIG/DATA fields of the frame format of the S1G PHY structure for use in the bandwidth of 2 MHz or higher are repeated twice or more times on a time axis or a frequency axis, such that a long-range PLCP frame can be constructed.

Figure 15:
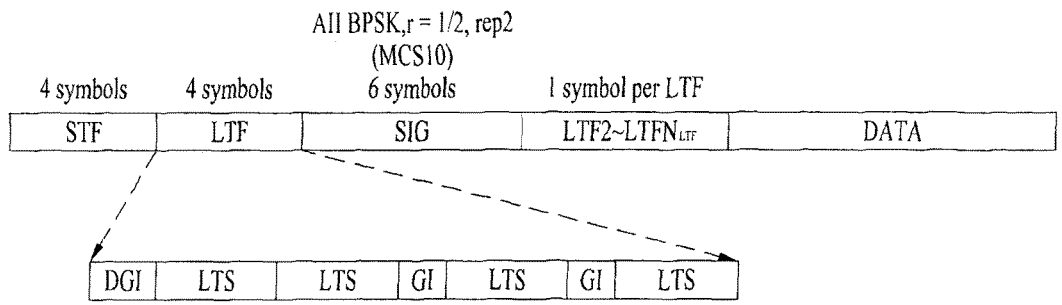
FIG. 15 is a conceptual diagram illustrating an example of a long-range PLCP frame format.

FIG. 15 is a conceptual diagram illustrating an example of a long-range PLCP frame format.

Although the PLCP frame format of FIG. 15 is comprised of STF, LTF1, SIG, LTF2-LTFN, and Data fields in a similar way to the Green-field format defined in IEEE 802.11n, a transmission time of the preamble part may increase two or more times by repetition as compared to the Green-field. The PLCP frame format shown in FIG. 15 may be applied to the 1 MHz bandwidth, and may be referred to as '1 MHz PPDU format'.

STF field of 1 MHz PPDU shown in FIG. 15 has the same periodicity as that of an STF (having a length of two symbols) of a PPDU of the bandwidth of 2 MHz or higher, a twice-repetition (rep2) method is applied to a time domain so that the STF field of the 1 MHz PPDU has the length of 4 symbols (for example, 160 µs) and the 3 dB power boosting is applied thereto.

LTF1 field of the 1 MHz PPDU shown in FIG. 15 is orthogonal to another LTF1 field (having a length of 2 symbols) of a PPDU of the bandwidth of 2 MHz or higher on a frequency domain, and is repeated twice on a time axis, such that the LTF1 field of the 1 MHz PPDU has a length of 4 symbols.

S1G field of the 1 MHz PPDU shown in FIG. 15 may be repeatedly coded. Quadrature Phase Shift Keying (QPSK), Binary PSK (BPSK), etc. for Modulation and Coding Scheme (MCS) may be applied to the S1G field of a PPDU of the bandwidth of 2 MHz or higher, and the S1G field has the length of 2 symbols. In contrast, the lowest MCS (i.e., BPSK) and the repetition (rep2) coding is applied to the S1G field of the 1 MHz PPDU, the S1G field of the 1 MHz PPDU has a rate of ½, and is defined to have the length of 6 symbols.

Fields from the LTF2 field to the LTFN field of the 1 MHz PPDU shown in FIG. 15 may be applied to MIMO, and each LTF field may have a length of one symbol.

The rep2 method may or may not be applied to the Data field of the 1 MHz PPDU shown in FIG. 15

Figure 16:
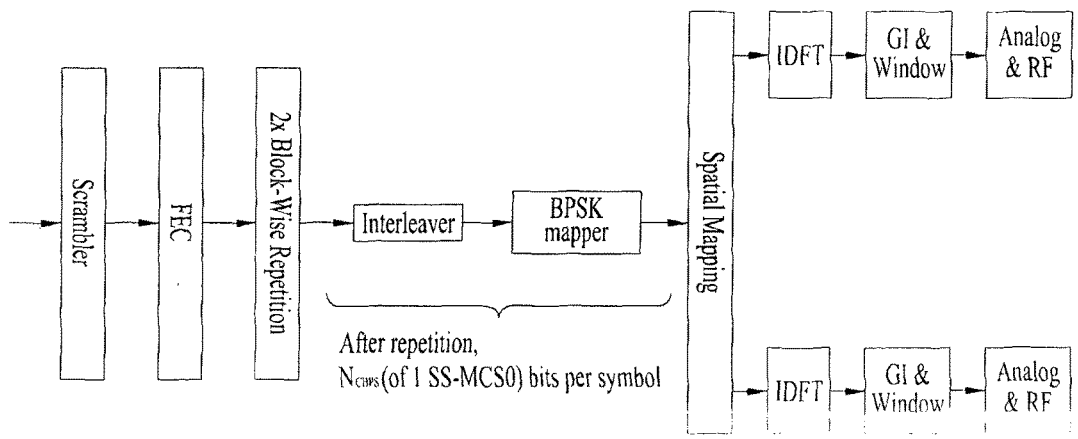
FIG. 16 is a conceptual diagram illustrating a repetition method for constructing a PLCP frame format of a 1 MHz bandwidth.

FIG. 16 is a conceptual diagram illustrating a repetition (rep2) method for constructing a PLCP frame format of a 1 MHz bandwidth.

A scrambler shown in FIG. 16 may scramble data to reduce the probability of repeating '0' or '1' for a long time. Forward Error Correction (FEC) may encode data for error correction. For this purpose, the scrambler may include a binary convolution encoder or a Low Density Parity Check (LDPC) encoder.

In accordance with '2x block-wise repetition', assuming that x encoded information bits of each OFDM symbol is repeated on a block basis to output 2x information bits. Here, assuming that the encoding rate is denoted by ½, x/2 information bits of each OFDM symbol is encoded so that x encoded information bits can be generated. After completion of repetition, assuming that the lowest MCS (for example, MCS0) is applied to one space stream (SS), each symbol may include $N_{CBPS}$ coded bits.

Thereafter, an interleaver may perform interleaving (or location exchange) to prevent a contiguous noise bit from being repeated in a long successive form. BPSK mapper may map the encoded data bit to the BPSK constellation point, or may map the encoded data bit to a complex symbol. In the space mapping, time-space streams may be mapped to transmission chains. Through Inverse Discrete Fourier Transform (IDFT), complex symbols may be converted into a time-domain block. In GI & Window, some parts of a symbol are attached (pr prepended) to the front part of the corresponding symbol so as to implement a guard interval (GI), edges of each symbol may be softened, and the windowing for increasing spectral decay may be carried out. A transmission symbol may be generated in analog and Radio Frequency (RF).

When the 1 MHz PPDU frame is constructed as described above, a duration of one PPDU is extremely lengthened, such that transmission efficiency may be reduced and the STA power consumption may be increased. In order to solve the above-mentioned problem, a method for reducing the length of a PPDU preamble and a method for compressing the MAC header may be used as necessary. The present invention provides a detailed MAC header compression method capable of efficiently transmitting data in a WLAN system.

The present invention assumes that the AP serves as a router. Open System Interconnection (OSI) 7 layer obtained when a computer network protocol design and communication is divided into a plurality of layers is shown in the following table 3.

TABLE 3

| |
| --- |
| Application Layer |
| Presentation Layer |
| Session Layer |
| Transport Layer |
| Network Layer |
| Data Link Layer |
| Physical Layer |

Generally, if the AP does not operate as a router, the AP may operate as a physical layer and data link layers (i.e., MAC layer and Logical Link Control (LLC) layer). Accordingly, there are needed four addresses (i.e., source address (SA), destination address (DA), transmitter address (TA), and a receiver address (RA)) in such a manner that the AP receives a frame and transmits the corresponding frame to a correct destination. For this purpose, the header of the MAC frame for use in the WLAN system may use four address fields as shown in FIG. 14. Contents of the four address fields may be determined according to values of 'To DS subfield' and 'From DS subfield' contained in the frame control field of the MAC header. Generally, the case in which each of the 'To DS' field and the 'From DS' field is set to 1 is not present in a current WLAN system, such that the Address 4 field is not used. Accordingly, assuming that the AP does not operate as the router, three address fields are needed in such a manner that the AP can receive the frame and transmit the corresponding frame to a correct destination.

On the other hand, assuming that the AP operates as a router, the AP may perform various functions of a physical layer, a data link layer (i.e., MAC layer, LLC layer, etc.), a network layer, a transport layer (for example, a Transmission Control Protocol/Internet Protocol (TCP/IP) layer), etc. The AP may perform data transmission using only TA and RA other than SA and DA in the MAC layer. In this case, the IP layer may perform correct frame transmission through SA and DA. In other words, assuming that the AP operates as a router, although only two address fields indicating TA and RA (for example, AP address and STA address) are contained in the MAC header of the frame, such that correct frame transmission can be performed.

As described above, the AP must operate as a router to perform MAC header compression such that two address fields (TA and RA) are contained as address information in the MAC header. However, each of APs do not operate as a router, such that the AP must inform another STA of capability information indicating whether the AP can operate as the router.

Figure 17:
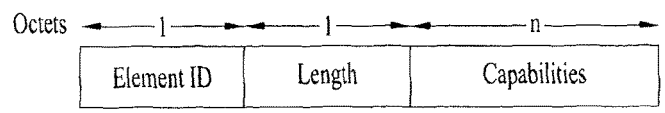
FIG. 17 is a conceptual diagram illustrating an example of an extended capability element according to an embodiment.

FIG. 17 is a conceptual diagram illustrating an example of an extended capability element according to an embodiment.

In FIG. 17, the Element ID field may be set to a specific value indicating that the corresponding element is identical to the Extended Capabilities element. The Length field may be set to the number of octets corresponding to the length of Capabilities field. Capabilities field may be a bit field indicating capability information of STA (or AP STA) configured to transmit the above element. The length of Capabilities field may be denoted by a variable 'n', and the position of each bit may indicate whether specific capability is supported.

The present invention provides a method for adding one bit indicating whether the MAC header compression function (i.e., indicating whether the router function is performed) is performed to the Capabilities field. One bit may be a bit reserved in the Capabilities field. The STA having received the extended capability element from the AP confirms the value of one bit, and the AP operates as the router, such that the STA and the AP can recognize whether to perform. MAC header compression. The extended capability element may be contained in an associated request/response frame, a re-associated request/response frame, a beacon frame, a probe response frame, etc.

As described above, assuming that MAC header compression is performed in such a manner that the MAC header includes two address fields (TA and RA) acting as address information, TA and RA of the compressed MAC frame format (also called a short MAC frame format) can be defined as shown in the following table 4.

TABLE 4

| Transmission direction | Transmitter Address | Receiver Address |
|---|---|---|
| DL | AP address | STA address |
| UL | STA address | AP address |

As shown in Table 4, TA and RA may be decided according to transmission direction. In the case of downlink (DL), TA is set to an AP address, and RA is set to an address of the STA receiving a frame. In the case of uplink (UL), TA is set to an address of the STA configured to transmit a frame, and RA is set to an address of the AP.

As described above, MAC header compression may be carried out in the MAC header such that address information is excluded from the MAC header (i.e., only requisite RA and TA are contained and other address information is omitted). In addition, the present invention provides a method for reducing overhead of address information contained in the MAC header.

As described above, the address field of the legacy MAC header is configured to have a MAC address of 48 bits. However, the present invention provides a method for using an associated identifier (AID) instead of the MAC address of the STA so as to compress address information. AID is defined to have the length of 16 bits. Accordingly, overhead of the MAC header can be greatly reduced when AID is used. TA and RA of the compressed MAC header proposed by the present invention may be defined as shown in the following table 5.

TABLE 5

| Transmission direction | Transmitter Address | Receiver Address |
|---|---|---|
| DL | BSSID | STA AID |
| UL | STA AID | BSSID |

As shown in Table 5, in the case of downlink (DL), TA (for example, Address 2 field) is set to BSSID, and RA (for example, Address 1 field) is set to an AID of the STA having received the frame. In the case of uplink (UL), TA (for example, Address 2 field) is set to an AID of the STA having transmitted a frame, and RA (for example, Address 1 field) is set to BSSID. BSSID may be identical to MAC address of the AP.

Method for Detecting Repetition of Frame Including Compressed MAC Header

If the MAC address of the STA is replaced with an AID in the MAC header, the STA having received the frame changes (or maps) the AID contained in the MAC header of the frame to the MAC address, and the STA stores the changed (or mapped) MAC address in a memory (or cache memory) along with a sequence number. As a result, retransmission of the compressed. MAC frame can be supported.

For example, the STA having received a DL frame from the AP stores not only the MAC address corresponding to a BSSID contained in the TA address field (i.e., Address 2 field) of the DL frame, but also the sequence number in the cache memory. If access category information is contained in the DL frame, BSSID, Sequence Number, and Access Category are stored in the cache memory.

The AP having received a UL frame from the STA may confirm the STA AID contained in the TA address field (i.e., Address 2 field) of the UL frame. Since the STA AID is allocated by the AP, the AP recognizes the MAC address (i.e., the mapping relationship between STA AID and STA MAC addresses) to which the corresponding AID is allocated. Accordingly, the AP may recognize the STA MAC address on the basis of the STA AID contained in the address field (i.e., Address 2 field) of the UL frame. The AP may store not only the STA MAC address (mapped to AID) identified by AID, but also Sequence Number in the cache memory. If Access Category information is contained in the UL frame, STA MAC Address, Sequence Number, and Access Category are stored in the cache memory.

The STA may manage the cache according to the sequence control scheme proposed by the present invention, such that correct retransmission of the compressed MAC frame (or short MAC frame) can be carried out. Specifically, in order to perform correct retransmission under the environment in which a frame including a normal MAC header and a frame including a compressed MAC header are used, the MAC header compression scheme and the sequence control scheme proposed by the present invention are needed.

For example, after a first STA transmits a first frame in which the compressed MAC header is used to a second STA, a normal MAC header may be used in a second frame transmitted to the second STA. Here, the first frame and a second frame are configured to transmit different MPDUs. In this case, since each of the compressed MAC frame and the normal MAC frame is retransmitted, a unified cache maintenance scheme is needed to efficiently determine the presence or absence of duplicated reception. Otherwise, a cache managed on the basis of an AID and a sequence number and a cache managed on the basis of a MAC address and a sequence number must be maintained not only in the frame transmission. STA but also in the frame reception STA, resulting in increased costs of the STA. In addition, assuming that different MPDUs corresponding to parts of one MDSU are transmitted through a frame of a normal. MAC header or a frame of a compressed MAC header, sequence control information must be managed using the same sequence number and different fragment numbers within a specific STA. Assuming that a sequence number based on the AID and a sequence number based on the MAC address are managed independently from each other, although repetition of such frames is detected, there may occur a malfunction in which the repeated frames cannot be correctly processed.

Accordingly, in association with the frame contained in the compressed MAC header configured to use the STA AID, the present invention provides a method for storing not only the STA MAC address (or mapped to STA AID) identified by the STA AID but also a sequence number in the cache memory.

In the frame transmission STA, a sequence number of the transmission frame is sequentially increased per RA or per {RA, access category}. In accordance with the proposal of the present invention, assuming that the RA address field (i.e., Address 1 field) of the transmission frame is a compressed MAC frame configured in the form of STA AID, the sequence number of the transmission STA is managed on the basis of the MAC address of the receiver. STA, instead of on the basis of the AID of the receiver STA. That is, the STA having transmitted the frame may store (or cache) the last sequence number per MAC address of the receiver STA.

A retry bit of the frame control field of the retransmitted frame is set to 1. Assuming that a frame having the retry bit of 1 is received and the received frame uses the compressed MAC header, STA AID contained in the address field of the compressed MAC header is converted into the STA MAC address. STA having received the frame may compare the converted STA-MAC address (or MAC address identified by the STA AID value contained in the address field of the received frame), a sequence number, and/or access category information with past cache information (i.e., the last stored STA MAC address, a sequence number, and access category information), such that the STA may determine whether a current reception frame is a duplicated frame.

Encryption of Short MAC Header

The present invention proposes a method for encrypting a short MAC frame (or a compressed MAC frame).

An encryption method of a frame configured to use a normal MAC header may be different from an encryption method of a frame configured to use a short MAC header. As shown in the following description, a method for constructing Additional Authentication Data (AAD) and a method for constructing a Nonce for use in a first case in which a normal MAC header is used are different from those of the other case in which a short MAC header is used. Accordingly, in order to correctly perform integrity verification of the MAC header, the present invention proposes a method for applying, the same frame format to transmission and retransmission of the same MPDU.

For example, after the MPDU is transmitted using a normal MAC frame (or normal MAC header), a short MAC frame (or MAC header) cannot be used in retransmission of the same MPDU, and the same MPDU may be retransmitted using a normal MAC frame (or normal MAC header). In addition, after the MPDU is transmitted using a short MAC frame 9 or a short MAC header), a normal MAC frame (or a normal MAC header) cannot be used in retransmission of the same MPDU, and the same MPDU may be retransmitted using a short MAC frame (or a short MAC header).

FIG. 18 is a block diagram illustrating CCMP (Counter mode with Cipher-block chaining Message authentication code Protocol) encapsulation.

For encryption of the MAC frame in IEEE 802.11, Temporal Key Integrity Protocol (TKIP), Counter mode with Cipher-block chaining Message authentication code Protocol (CCMP), etc. may be used. CCMP was proposed by IEEE 802.11i standard. CCMP is an enhanced cryptographic encapsulation method designed for confidentiality on the basis of CCM of Advanced Encryption Standard (AES).

A security mechanism for use in IEEE 802.11 may be provided to a data frame and a management frame. In more detail, data confidentiality, authentication, integrity, replay protection, etc. may be provided using TKIP, CCMP, etc.

Referring to the example of FIG. 18, it may be possible to obtain an encrypted MPDU from payload of a plaintext MPDU.

In more detail, a packet number (PN) may be increased to obtain a new PN value of each MPDU.

AAD for CCM may be constructed using fields of the MAC header of the plaintext MPDU. The CCM algorithm may provide integrity protection of fields contained in the AAD. AAD may include a Frame Control (FC) field, an A1 (Address 1) field, an A2 (Address 2) field, an A3 (Address 3) field, a SC (Sequence Control) field, an A4 (Address 4) field, and a QC (QoS Control) field.

CCM Nonce may be constructed on the basis of a PN value, an A2 (Address 2) field of MPDU, and a priority value. Nonce may represent a number or a bit string used only once in the security algorithm.

8-octet CCMP header may be formed on the basis of a PN value and a key identifier (KeyID).

Encrypted data and MIC (Message Integrity Code) may be formed using Temporary Key (TK), AAD, Nonce, and MPDU data.

The original MPDU header, the generated CCMP header, the generated encrypted data, and MIC are combined with one another, such that the encrypted MPDU is formed.

FIG. 19 is a conceptual diagram illustrating a frame control field of a short MAC header according to an embodiment.

Subfields of the frame control (FC) field of the short MAC header shown in FIG. 19 may be partially different from the sub-fields of the normal MAC header shown in FIG. 14. For example, compared to a normal. MAC header, the Type field of the FC field of a short MAC header is 4 bits long and does not have the subtype field. In addition, compared to a normal MAC header, the FC field of a short MAC header does not include the To DS field and the Order field. Compared to a normal MAC header, the FC field of the short MAC header includes an End Of Service Period (EOSP) field.

As can be seen from an exemplary format of the FC field of the short MAC header shown in FIG. 19, the FC field of the short MAC header according to the embodiment includes a Protocol Version field (of 2 bits), a Type field (of 4 bits), a From DS field (of 1 bit), a More Fragments field (of 1 bit), a Power Management field (of 1 bit), a More Data field (of 1 bit), a Protected Frame field (of 1 bit), and an EOSP field (of 1 bit).

As shown in FIG. 18, AAD is constructed using the fields of the MAC header, and a method for constructing the AAID when the FC field of a short MAC header shown in FIG. 19 will hereinafter be described with reference to FIG. 20.

FIG. 20 is a conceptual diagram illustrating an example of Additional Authentication Data (AAD) according to an embodiment.

In FIG. 20, FC denotes a Frame Control field and has the size of 2 octets.

The FC field of AAD shown in FIG. 20 may be constructed according to the FC field of the short MAC header shown in FIG. 19. Here, the Power Management bit of the FC field in AAD may be masked to zero (0). In addition, the More Data bit of the FC field in AAD may be masked to zero (0). In addition, the Protected Frame bit of the FC field in AAD may always be set to 1. In addition, the EOSP bit of the FC field in AAD may be masked to zero (0). The Retry bit may be masked to zero (0). Assuming that a certain field is masked to zero, this means that the corresponding field is contained in AAD but is not in use.

A1, A2, A3, and A4 of FIG. 20 may correspond to Address 1, Address 2, Address 3, and Address 4 fields of the MPDU, respectively. A1 field may have 6 octets or 2 octets. The A2 field may have 6 octets or 2 octets. The A3 or A4 field may have 6 octets.

As described in Tables 4 and 5, at least one of A3 and A4 fields may be omitted from the short MAC header, and the short MAC header may always have A1 (i.e., RA) and A2 (i.e., TA) fields. In addition, assuming that the A1 field is comprised of the MAC address or a BSSID, the A1 field may have 6 octets. Assuming that the A1 field is comprised of the AID, the A1 field may have 2 octets. If the A2 field is comprised of a MAC address or a BSSID, the A2 field may have 6 octets. If the A2 field is comprised of the AID, the A2 field may have 2 octets.

As described above, one of the A3 and A4 fields may be omitted from the AAD, or all of the A3 and A4 fields may be omitted form the AAD. For example, assuming that A3 is omitted from the short MAC header, AAD may be comprised of FC, A1, A2, A4, and SC. If the A4 field is omitted from the short MAC header, AAD may be comprised of FC, A1, A2, A3, and SC. Alternatively, assuming that A3 and A4 fields are omitted from the short MAC header, AAD may be comprised of FC, A1, A2, and SC.

Here, the A2 field of AAD may have 6 octets or 2 octets.

In more detail, the A1 field of AAD shown in FIG. 20 may be constructed according to Address 1 field of MPDU. The A1 field of AAD may be comprised of AID (2 octets) or MAC address (6 octets) according to a frame direction (for example, UL frame or DL frame). In the case of a DL frame in which the From DS bit of the FC Field of the short MAC header is set to 1 (here, the From DS bit of the FC field of AAD may be set to 1), the A1 field of AAD may be comprised of AID (2 octets) of the receiver STA. Alternatively, in the case of a UL frame in which the From DS bit of the FC field of the short MAC header is set to zero (0) (here, the From DS bit of the FC field of AAD may be set to zero), the A1 field of AAD may be comprised of a MAC address or a BSSID (6 octets) of the receiver STA (or AP).

In addition, the A2 field of AAD may have 6 octets or 2 octets.

In more detail, the A2 field of AAD of FIG. 20 may be constructed according to the Address 2 field. The A2 field of AAD may be comprised of an AID (2 octets) or a MAC address (6 octets) according to a frame direction (for example, UL frame or DL frame). In the case of a DL frame in which the From DS bit of the FC field of the short MAC header is set to 1 (here, the From DS bit of the FC field of AAD may be set to 1), the A2 field of AAD may be comprised of a MAC address or BSSID (6 octets) of the transmitter STA (or AP). Alternatively, in the case of a UL frame in which the From DS bit of the FC field of the short MAC header is set to zero (here, the From DS bit of the FC field of AAD may be set to zero), the A2 field of AAD may be comprised of an AID (2 octets) of the transmitter STA.

Assuming that the A3 field shown in FIG. 20 is present, the A3 field is constructed according to the Address 3 field of the MPDU. In addition, the A3 Present bit of AAD may indicate whether the A3 field is contained in the compressed MAC header or AAD. Assuming that the A4 field shown in FIG. 20 is present, the A4 field may be constructed according to the Address 4 field of MPDU.

In FIG. 20, AC may denote the Sequence Control field, and may have 2 octets. The SC field of AAD shown in FIG. 20 may be constructed according to the Sequence Control field of MPDU.

As described in the above-mentioned duplicate detection section, the Sequence Control field of the MAC header is comprised of the Sequence Number field and the Fragment Number subfield, and the SC field of AAD shown in FIG. 20 may be comprised of the Sequence Number and Fragment Number subfields. The Sequence Number subfield (corresponding to bits 4 to 15 of the Sequence Control field) of the SC field of AAD shown in FIG. 20 may be masked to zero (0). In addition, the Fragment Number subfield of the SC field in AAD shown in FIG. 20 may not be modified as compared to the Fragment Number subfield of the SC field.

The order of AAD constituent elements shown in FIG. 20 is not limited, and AAD constructed according to the embodiment may include some parts of the subfields shown in FIG. 20.

FIG. 21 is a conceptual diagram illustrating a Nonce according to an embodiment.

Nonce shown in FIG. 21 may include the Nonce Flags field, the A2 (Address 2) field, and the PN field. The Nonce Flags field may have the size of one octet. The A2 field may have 6 octets or 2 octets. The PN field may have 6 octets.

A detailed description of the Nonce Flags field is shown in FIG. 21. The Nonce Flags field may be comprised of 4 bits of the Priority subfield, one bit for the Management subfield, and three reserved bits.

The Priority field of the Nonce Flags shown in FIG. 21 may be set to a specific value indicating a priority of the short MAC frame. For example, the Priority field may be set to either a specific value indicating a Traffic Identifier (TID) of plaintext MPDU or another value indicating Access Category.

The Management field of the Nonce Flags shown in FIG. 21 may be set to a specific value indicating whether the plaintext MPDU is a management frame.

The A2 field of Nonce shown in FIG. 21 may be constructed according to the Address 2 field of the short MAC header. The A2 field of the Nonce may be comprised of an AID (2 octets) of the transmitter STA or a MAC address (6 octets) according to a frame direction (for example, UL frame or DL frame). In the case of a DL frame in which the From DS bit of the FC Field of the short MAC header is set to 1, the A2 field of Nonce may be comprised of a MAC address or BSSID (6 octets) of the transmitter STA (or AP) identified by the A1 field of the short MAC header. Alternatively, in the case of a UL frame in which the From DS bit of the FC field of the short MAC header is set to zero, the A2 field of Nonce may be comprised of an AID (2 octets) of the transmitter STA.

Figure 22:
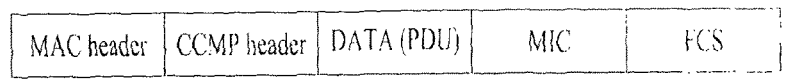
FIG. 22 is a conceptual diagram illustrating an exemplary encrypted MPDU according to an embodiment.

FIG. 22 is a conceptual diagram illustrating an exemplary encrypted MPDU according to an embodiment.

As previously stated in FIG. 18, an encrypted MPDU corresponding to the encrypted result of the plaintext MPDU may be comprised of a MAC header (MAC header of the plaintext MPDU of FIG. 18) shown in FIG. 22, a CCMP header (CCMP header generated on the basis of PN and KeyID shown in FIG. 18) shown in FIG. 22, encrypted data generated in FIG. 22, and MIC and FCS (Frame Check Sequence).

A Temporal Key must be updated per session in CCMP, and a unique nonce value is additionally needed for each frame of a given temporal key. In order to satisfy the above requirements, a Packet Number (PN) value of 48 bits is used, and the PN value may be initialized to 1 whenever the Temporal Key is updated.

As shown in FIG. 22, the PN value may be contained in a CCMP header and then transmitted. The CCMP header may include a PN field composed of 6 octets (i.e., 48 bits), and the 6 octets may be referred to as PN0, PN1, PN2, PN3, PN4, and PN5, respectively.

The present invention proposes a method for additionally reducing the MAC overhead of the encrypted PPDU by reducing the size of a PN field contained in the short MAC frame.

In more detail, only some parts (for example, PN0 and PN1) of the 6 octets of the PN are contained in the CCMP header, and the remaining parts (for example, PN2, PN3, PN4, and PN5) may be synchronized between one STA configured to transmit the MAC frame and the other STA configured to receive the MAC frame.

For example, when the STA transmits the first encrypted PPDU, the entire PN values of 48 bits may be transmitted using a normal MAC frame format without using a short MAC frame format.

Assuming that the transmitter STA and the receiver STA support the short MAC frame, the PN value of 48 bits of the encrypted PPDU transmitted using the normal MAC frame format may be stored or maintained in the receiver STA. For example, in association with a PPDU that is successfully received without errors and completes integrity verification through decryption, a cache of the set of {Transmitter Address, Temporal Key, PN 48 bits} may be stored and maintained by the receiver STA.

After the PN value is synchronized among Tx/Rx STAs, a PPDU obtained by encryption of the short MAC frame can be transmitted. Here, the PPDU may be different from an encrypted PPDU transmitted through a normal MAC frame. Thereafter, the CCMP header contained in the short MAC frame may include only some parts (for example, PN0 and PN1) from among 48-bit PN values, resulting in reduction of MAC overhead.

The STA having received a PPDU obtained by encryption of the short MAC frame may use a pre-stored PN value so as to decrypt the short MAC frame. That is, assuming that PN0 and PN1 are contained in the CCMP header of the short MAC header, the PN value (corresponding to the remaining PN2, PN3, PN4 and PN5) comprised of 48 bits may be constructed using the value stored in the receiver STA. The MAC frame may be decoded using the 48-bit PN value constructed by combining some parts of the CCMP header with the remaining stored parts (i.e., on the assumption that the above PN value obtained by the above combination is applied to the Nonce structure).

If the temporal key is changed, the receiver STA deletes the PN value stored as the set of {Transmitter Address, Temporal Key, PN 48 bits}. Accordingly, assuming that the temporal key is changed, the transmitter STA does not use the short MAC frame format, and has to transmit the overall. PN values of 48 bits to the receiver STA using the normal MAC frame format. As a result, the PN value may be re-synchronized between the Tx STA and the Rx STA.

In contrast, as shown in the above-mentioned duplicate detection section, the MAC header may include the Sequence Control field, and the value of the Sequence Number subfield of the Sequence Control field may be increased one by one per PPDU. The Sequence Number value is used as some parts of the PN value (or the Sequence Number value is associated with some parts of the PN value), such that the MAC overhead may be further reduced.

In this case, the overall PN value may be transmitted to the receiver STA in the initially transmitted frame. The receiver STA stores the overall PN value, and at the same time stores the set of the Sequence Number values of the Sequence Control field of the MAC header of a current reception frame. For example, the receiver STA may store and maintain the set of {Transmitter Address, Temporal Key, PN 48 bits, Sequence Number} in the cache memory. In the case of using the short MAC frame in subsequent transmission, the PN field may not be contained in the CCMP header. In this case, the receiver StA may acquire the PN value using the Sequence Number value of the Sequence Control field of the encrypted MPDU generated from the short MAC frame.

In addition, if the temporal key (TK) is changed, the receiver STA may delete the PN value stored as the set of {Transmitter Address, Temporal Key, PN 48 bits, Sequence Number}. Accordingly, if the temporal key (TK) is changed, the transmitter STA does not use the short MAC frame format, and has to transmit the PN value of 48 bits to the receiver STA using the normal MAC frame format. As a result, the PN value may be re-synchronized between the Tx/Rx STAs.

In addition, assuming that the Sequence Number is used as some parts of the PN value, the Sequence Number may also be initialized according to initialization of the PN value.

Figure 23:
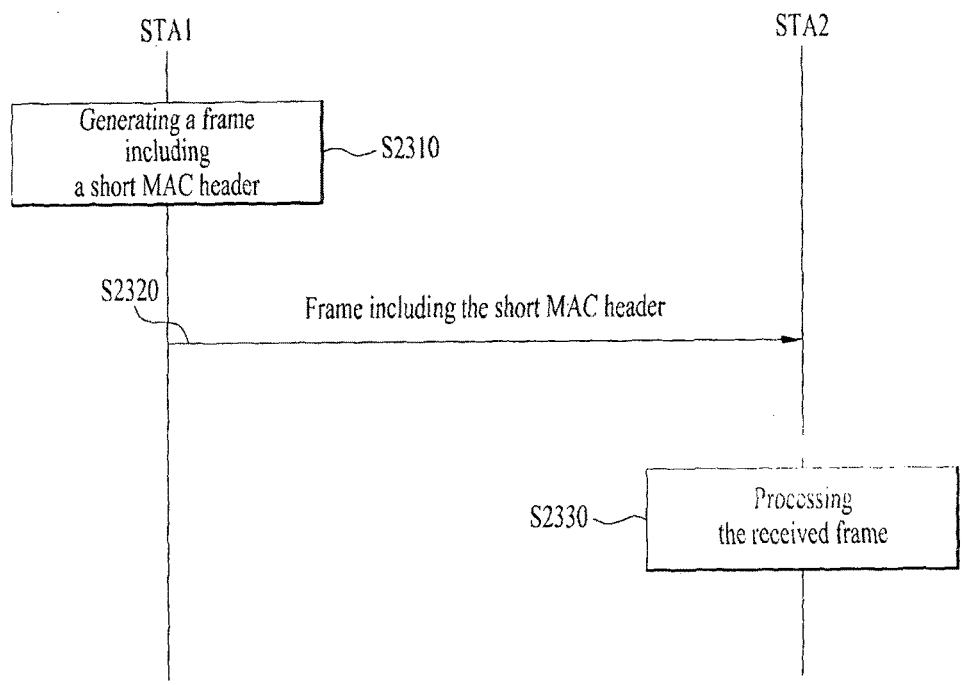
FIG. 23 is a flowchart illustrating a method for transmitting/receiving a frame supporting a short MAC header according to an embodiment.

FIG. 23 is a flowchart illustrating a method for transmitting/receiving a frame supporting a short MAC header according to an embodiment.

Referring to FIG. 23, a first STA may generate a frame including a short MAC header to be transmitted to a second STA in step S2310.

The short MAC header may include the A1 field indicating the receiver address (i.e., a second STA address) and the A2 field indicating the transmitter address (i.e., a first STA address). In this case, one of the A1 field and the A2 field may include the AID value according to a transmission direction (UL/DL). If the A1 field includes the AID value, a sequence number may be allocated to the STA MAC address (i.e., MAC address of the first STA) identified by the AID value according to the AID value. The sequence number allocated to the STA MAC address identified by the AID value may be cached by the first STA. In addition, the short MAC header may include the FC field, the A1 field, the A2 field, and the SC field, and the sequence number information may be included in the SC field.

A first STA may generate a frame including the encrypted MPDU. AAD may be contained in the encrypted MPDU, and the AAD may be constructed on the basis of the FC field, the A1 field, the A2 field, and the SC field of the short MAC header. In the same manner as in the A1 and A2 fields of the short MAC header, one of the A1 and A2 fields of AAD may include the AID value according to a transmission direction (UL/DL) of the frame. In addition, the FC field of AAD may include a Protocol Version field, a Type field, a From DS field, a More Fragments field, a Power Management field, a More Data field, a Protected Frame field, and an EOSP (End Of Service Period) field. The Power Management field may be masked to zero (0), the More Data field may be masked to zero (0), the Protected Frame field may always be set to 1, and the EOSP bit may be masked to zero.

In addition, the encrypted MPDU may further include a Nonce, and the Nonce may include a Nonce Flags field, an A2 field, and a Packet Number (PN) field. The Nonce Flags field of the Nonce may be constructed on the basis of MPDU priority information and specific information indicating whether the MPDU is a management frame. The A2 field of the Nonce may be set to a MAC address value of the first STA identified by the A2 field of the MPDU. The PN field of the Nonce may be constructed on the basis of PN information used to encrypt the MPDU.

The first STA may transmit a frame including the short MAC header to the second STA in step S2320.

The second STA may process the received frame in step S2330.

For example, if the transmitter address (TA) field (i.e., A2) field of the short MAC header of the received frame includes an AID value, the second STA may cache not only the STA MAC address identified by the corresponding AID value but also a sequence number value contained in the SC field of the short MAC header.

If the STA MAC address identified by the AID value contained in the short MAC header and the sequence number value contained in the short MAC header are identical to the STA MAC address identified by the pre-cached AID value and the sequence number, the second STA may determine the corresponding frame to be a duplicated frame.

Meanwhile, if the second STA receives a frame including the encrypted MPDU, the second STA may perform decryption of the MPDU on the basis of the encrypted MPDU construction.

The method for transmitting/receiving a frame supporting the short MAC header of the embodiment shown in FIG. 23 may be implemented such that the above described various embodiments of the present invention may be independently applied or two or more embodiments thereof may be simultaneously applied.

Figure 24:
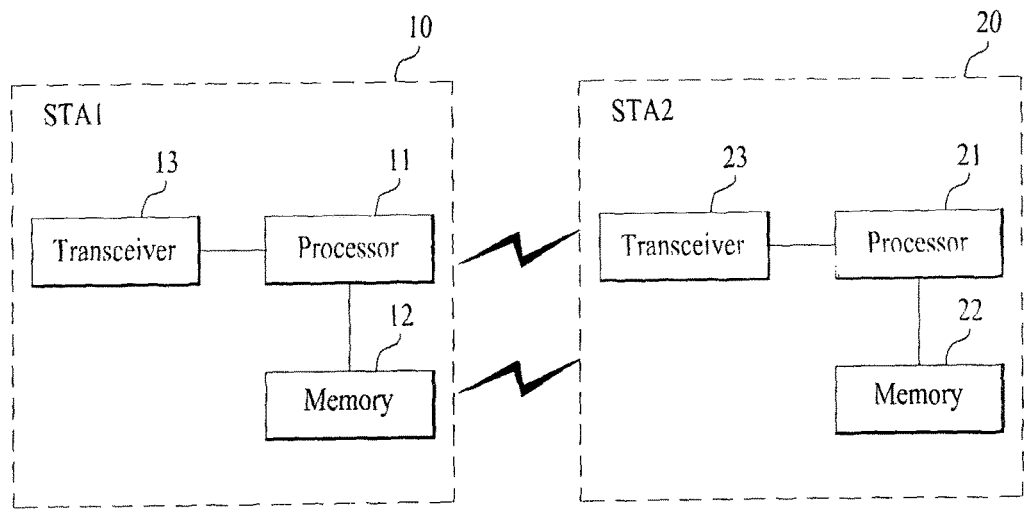
FIG. 24 is a block diagram illustrating a radio frequency (RF) device according to one embodiment of the present invention.

FIG. 24 is a block diagram illustrating a radio frequency (RF) device according to one embodiment of the present invention.

Referring to FIG. 24, an STA1 10 may include a processor 11, a memory 12, and a transceiver 13. An STA2 20 may include a processor 21, a memory 22, and a transceiver 23. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 may be configured to operate according to the above described various embodiments of the present invention. Modules for implementing operation of the STA1 and STA2 according to the above described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

STA1 10 shown in FIG. 24 may manage a sequence number in the WLAN system. The processor 11 of the STA1 may enable the STA1 10 to transmit a frame including the short MAC header to the STA2 20 using the transceiver 13. Here, one of the RA field and the TA field contained in the short MAC header may include an AID value according to whether the transmission direction of the frame is a UL or DL direction. If the RA field includes the AID value, the sequence number may be allocated to the STA MAC address identified by the AID value.

STA1 10 shown in FIG. 24 may perform encryption of a MAC Protocol Data Unit (MPDU) in the WLAN system. The processor of the STA1 may construct the AAD including a Frame Control (FC) field, an Address 1 (A1) field, an Address 2 (A2) field, and a Sequence Control (SC) field. The processor 11 of the STA1 may transmit a frame including an encrypted MPDU including the AAD to the STA2 20 using the transceiver 13. Here, the FC field of the AAD, the A1 field, the A2 field, and the SC field may be constructed on the basis of the FC field of the MPDU, the A1 field, the A2 field, and the SC field. One of the A1 field and the A2 field of the AAD may include an AID value according to whether a transmission direction of the frame is a UL or DL direction.

Meanwhile, STA1 20 shown in FIG. 24 may manage a sequence number. The processor 21 of the STA2 may enable the STA2 20 to receive a frame including the short MAC header from the STA1 10 using the transceiver 23. Here, one of the RA field and the TA field contained in the short MAC header may include an AID value according to whether the transmission direction of the frame is a UL or DL direction. If the TA field includes the AID value, not only the STA MAC address identified by the AID value but also the sequence number value contained in the MAC header may be cached by the STA2 20.

The overall configuration of the STA1 10 and the STA2 20 shown in FIG. 24 may be implemented such that above described various embodiments of the present invention may be independently applied or two or more embodiments thereof may be simultaneously applied and a repeated description thereof is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based upon an IEEE 802.11 system, the embodiments may be applied in the same manner to various mobile communication systems.

The invention claimed is:

1. A method for managing a sequence number in a wireless LAN (WLAN) system, comprising:
receiving, by a second station (STA), a frame including a compressed MAC header from a first STA; and
checking, by the second STA, a corresponding cache to determine whether the frame is a duplicated frame,
wherein the compressed MAC header includes a receiver address (RA) field, a transmitter address (TA) field and a sequence control field,
wherein the sequence control field includes a sequence number value for the frame,
wherein when the frame is an uplink (UL) frame the TA field includes an associated identifier (AID) value,
wherein when the frame is a downlink (DL) frame the RA field includes the AID value,
wherein when the TA field includes the AID value, the corresponding cache is checked based on a STA MAC address identified by the AID value and the sequence number value, and
wherein when the frame is determined to be the duplicated frame, the STA MAC address identified by the AID value and the sequence number value contained in the compressed MAC header are respectively identical to an STA MAC address and a sequence number value of the corresponding cache.

2. The method according to claim 1, wherein a retry bit of the frame is set to 1.

3. The method according to claim 1, wherein:
if the frame is transmitted in UL direction, the receiver address (RA) field includes a Basic Service Set Identifier (BSSID), and the transmitter address (TA) field includes the AID value of the first STA.

4. The method according to claim 1, wherein the compressed MAC header includes a Frame Control field, an Address 1 field, an Address 2 field,
wherein the Address 1 field is the receiver address (RA) field, and
the Address 2 field is the transmitter address (TA) field.

5. A station (STA) for managing a sequence number in a wireless LAN (WLAN) system, comprising:
a transceiver that receives a frame including a compressed MAC header from another STA; and
a processor that checks a corresponding cache to determine whether the frame is a duplicated frame,
wherein the compressed MAC header including a receiver address (RA) field, a transmitter address (TA) field and a sequence control field,
wherein the sequence control field includes a sequence number value for the frame,
wherein when the frame is an uplink (UL) frame the TA field includes an associated identifier (AID) value,
wherein when the frame is a downlink (DL) frame the RA field includes the AID value,
wherein when the TA field includes the AID value, the corresponding cache is checked based on a STA MAC address identified by the AID value and the sequence number value, and
wherein when the frame is determined to be the duplicated frame, the STA MAC address identified by the AID value and the sequence number value contained in the compressed MAC header are respectively identical to an STA MAC address and a sequence number value of the corresponding cache.

* * * * *